May 15, 1962  R. R. RUDOLPH  3,035,145
HUMIDIFIER

Filed Nov. 2, 1959  3 Sheets-Sheet 1

INVENTOR.
Robert R. Rudolph
BY T W Secrest

May 15, 1962  R. R. RUDOLPH  3,035,145
HUMIDIFIER

Filed Nov. 2, 1959  3 Sheets-Sheet 2

INVENTOR.
Robert R. Rudolph
BY
TW Secrest 3,035,145
HUMIDIFIER
Robert R. Rudolph, Seattle, Wash., assignor of one-half to John Metzger and one-half to W. H. Anderson, both of Seattle, Wash.
Filed Nov. 2, 1959, Ser. No. 850,168
1 Claim. (Cl. 219—38)

This invention relates to a humidifier and, more particularly, to a humidifier for use in an airplane.

Recently developed airplanes fly at altitudes of approximately 40,000 to 50,000 feet. Make-up air is taken from the atmosphere at these altitudes and circulated in the pilot's cabin and in the passengers' lounge. The atmospheric air at these altitudes is at a temperature of approximately —58° F. to —60° F. Also, the atmospheric air is substantially saturated with moisture or at about 100% relative humidity. This air is taken into the airplane and compressed until it is at a pressure equivalent to about 8,000 feet elevation. Also, the air is heated to a temperature in the range of 40°–190° F., preferably, about 75° F. At this temperature the air is almost completely dry and the relative humidity is almost zero percent.

The circulation of air having such a low relative humidity dries the throats of both the passengers and the crew. Because of this drying the passengers and the crew are likely to have sore throats and, in certain instances, the crew may be prone towards an accident. Because of this dehumidification effect I have invented a humidifier for use in an airplane. This humidifier is light in weight; small in size; automatically regulates the upper relative humidity of the atmosphere in the airplane; possesses safety means to regulate the maximum temperature in the vaporizing unit; and, has safety means to regulate the maximum outlet temperature.

Other advantages will appear in the course of the following description, wherein.

Figure 1:
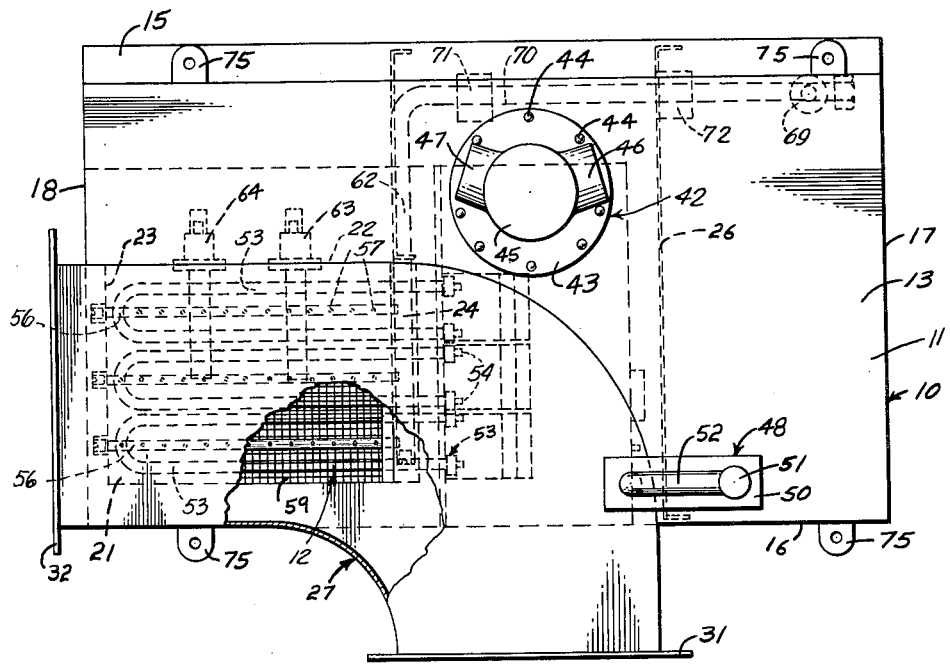
FIGURE 1 is a fragmentary plan view looking down on a preferred embodiment of the invention constructed in accordance with the specific teachings of the invention, and illustrates by the use of phantom lines the main component parts.
Figure 2:
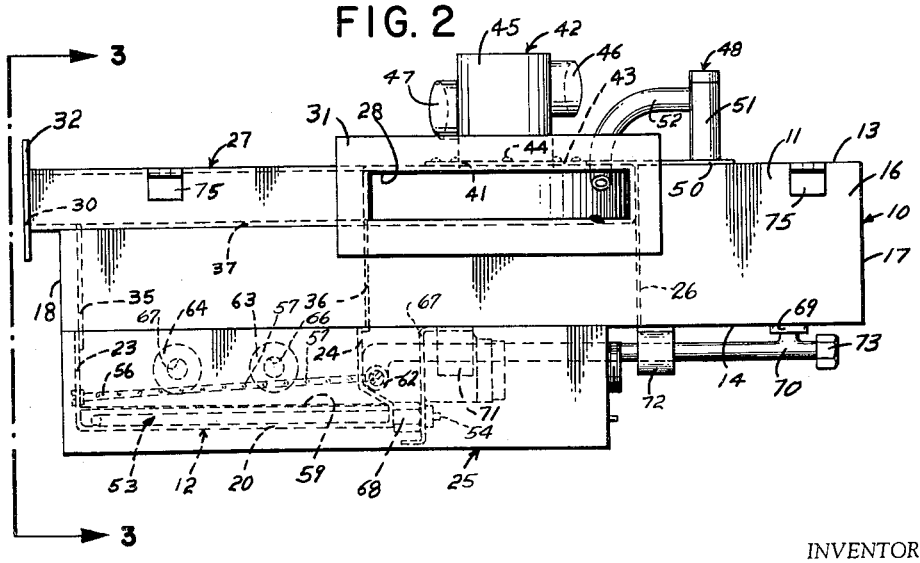
FIGURE 2 is a side elevation view looking at the intake port, and illustrates by the use of phantom lines the arrangement of the heating elements in the vaporizing unit.
Figure 3:
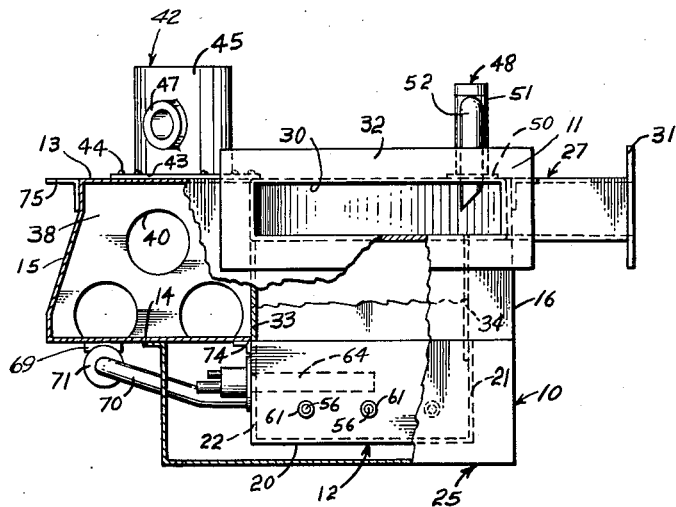
Figure 4:
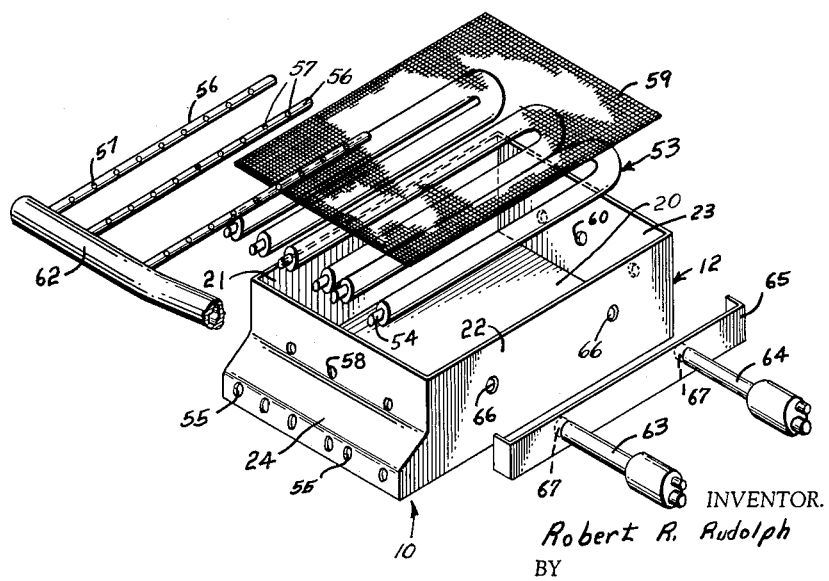
Figure 5:
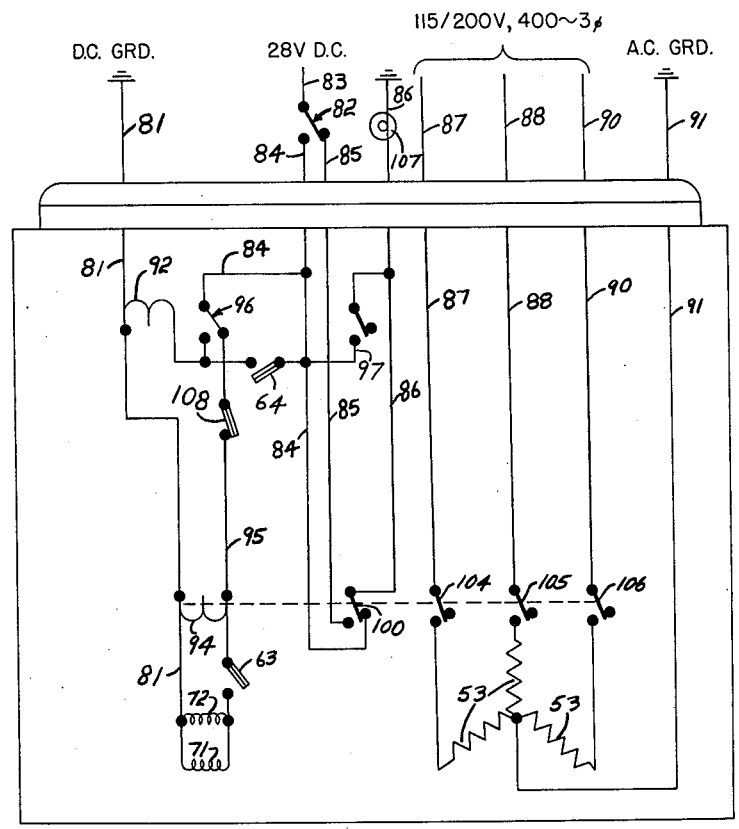

FIGURE 3 on an enlarged scale, is a fragmentary side elevation view looking at the outlet port, and illustrates the arrangement of the vaporizing unit in relation to the water-storage reservoir;

FIGURE 4, on an enlarged scale, is an exploded view of the components of the vaporizing unit, and illustrates the tank, heating element, screen, liquid delivery means, and temperature control units; and, FIGURE 5 is a schematic wiring diagram of the electrical system of the humidifier.

Referring to the drawings it is seen that the humidifier is identified by reference numeral 10. This humidifier comprises a compact unit having an upper portion 11 generally in the configuration of a rectangular compartment and a lower vaporizing unit 12.

The upper portion 11 has a top 13, a bottom 14, a diagonally shaped back 15, a front 16 and sides 17 and 18.

The lower vaporizing unit 12 is smaller than the upper portion 11. This unit comprises a bottom 20, a front 21, a back 22, a side 23, and a diagonally shaped side 24. There is no top for 12 as this unit communicates directly with the upper portion 11.

A cover 25 envelopes the unit 12 so as to both protect it and to preclude a person being burned on it.

The upper portion 11 is divided into various individual compartments. A baffle 26 runs from the front 16 to the back 15 and is positioned about one-third of the distance from the side 17. In this baffle are punched holes to both lighten the baffle and to allow the water to circulate therein.

The upper central part of the front 16 is cut away so as to form an inlet opening, and upper right part of the side 18 is cut away so as to form an exit opening. A curved air duct 27 having an inlet 28 and an outlet 30 runs between these two openings. Surrounding the opening 28 is a flange 31 and surrounding the opening 30 is a flange 32. These flanges are for connecting with air chutes in other apparatus.

Returning to the upper portion 11 and the connection between the vaporizing unit 12 and the air duct 27, the bottom 14 above the unit 12 is cut away so as to allow communication between the unit 12 and the unit 11. However, positioned above the side 22 and in the unit 11 is a wall 33. This wall runs from the wall 22 to the air duct 27. A wall 34 overlaps the upper part of the wall 21 and runs to the duct 27. Another wall 35 overlaps the upper edge of the wall 23 and runs to the duct 27. A fourth wall 36 overlaps the upper part of the wall 24 and runs to the duct 27. In effect, the four integral walls 33, 34, 35 and 36 are a chimney to allow water vapor to rise from the vaporizing unit 12 to duct 27. The bottom of the duct is cut away to provide an opening 37 with the chimney and the vaporizing unit.

A wall 38 runs from approximately the edge of the junction of 33 and 36 to the diagonal wall 15. In this wall are a number of punched holes 40.

It is seen from the above that the upper part 11, exclusive of the chimney and the air duct, is a storage tank for water.

In the top 13 is an opening 41. Cofitting with this opening is a fill assembly 42 having a base flange 43. This flange is attached to the top 13 by means of rivets 44. The assembly comprises an upright cylindrical fill-inlet 45 having an upper inlet pipe 46 and a lower overflow pipe 47 disposed at an angle with respect to the pipe 46.

Also on the top 13 is an equalizing pressure assembly 48 comprising a base plate 50. On this plate is mounted an upright stand pipe 51. This pipe is sealed at the top and communicates at its lower end with the interior of the water storage compartment of the upper portion 11. Connecting with the stand pipe 51 and the interior of the air duct 27 is a curved pipe 52. As is readily appreciated the equalizing pressure assembly 48 makes it possible for the pressures in the water storage compartment and the air chute to be equalized.

In the vaporizing unit 12 is the necessary equipment for vaporizing the water. This equipment comprises U-shaped heating elements 53. In the particular embodiment illustrated in FIGURE 4 there are three of these elements. The contact ends 54 project through punched holes 55 along the lower edge of the side 24.

Positioned on the heating elements 53 is a wire screen 59. This screen distributes heat from the elements 53.

Also in the unit 12 and positioned above the heating elements 53 are water distribution pipes 56 having water holes 57. These pipes project through punched holes 58 in the side 24 and through punched holes 60 in the side 23. The end of the pipe 56 which extends through each hole 60 is sealed and secured in position by a lock ring 61. The inner end of each pipe 56 which passes through the corresponding hole 58 connects with a distribution pipe 62.

As is appreciated water runs out of the holes 57 and falls on the screen 59, and is distributed thereon. Because of the heat in the screen the water vaporizes.

As a control and safety means there are provided two thermostatic switches 63 and 64. A bracket 65 is attached to the side 22. The thermostats 63 and 64 project through holes 66 and 67 in the bracket 65 and the side 12. These thermocouples are positioned above the pipes 56.

As a detail of construction the heating elements 53 are supported by a bracket 65 which is secured to the bottom 14 of the compartment 11. A spacer 68 is between the bracket 65 and the side 24 of the vaporizing unit.

A feed line 70 connects the water distribution line 62 with the water storage compartment. At the union of this line with the storage compartment there is a filter unit 69. An end cap 73 seals the end of the pipe 70.

In the line 70 is a normally closed solenoid stop valve 71 and a normally closed solenoid metering valve 72.

Some of the details of the construction of the humidifier comprise an angle 74 connecting the bottom 14 of the upper compartment 11 with the side 22 of the vaporizing unit 12. As previously brought forth the members 23 and 35, and the members 34 and 21 are lap jointed. And on the humidifier 10 are a number of attaching lugs 75 for securing the humidifier to the airplane.

Turning now to the electrical control system for the humidifier, attention is directed to FIGURE 5 wherein 81 is for D.C. ground; 82 is a switch for lead 83 connecting with 28 volts D.C., and leads 84 and 85; 86 is a ground D.C. for the 28 volt D.C.; 87, 88 and 90 are leads for the 115/200 volt, 400 cycle, 3-phase power; and 91 is the A.C. ground.

Ground wire 81 connects with lockout relay 92; normally open; power relay 94, normally open; and solenoid valves 72 and 71, normally closed; which connect with branch 95 of the lead-in 84. In branch 95 is the low-limit thermostatic switch 63, normally open. The branch 95 connects with a switch 96.

The relay 92 connects with the switch 96 and the high temperature thermostatic switch 64, normally open. This switch in turn connects with the lead 84.

A switch 97 is between the leads 84 and 86. The switches 96 and 97 are under the control of the relay 92.

A double throw-switch 100 is positioned between the leads 84 and 86 and the leads 85 and 86. The switch 100 is under the control of the relay 94.

In the leads 87, 88 and 90 are switches 104, 105 and 106. These switches are under the control of the relay 94. As is seen in FIGURE 5 these switches are in the lead-in to the heating elements 53. In the ground lead 86 is an indicator light 107.

With the switch in the position illustrated in FIGURE 5, i.e., leads 83 and 85 connected, the heating elements 63 are not being heated. By throwing the switch 82 so that leads 83 and 84 are engaged, the relay 94 is activated to close switches 104, 105 and 106 so that the heating elements 63 heat. With a rise in temperature above 198° F. the normally open thermostatic switch 63 closes with the result that the normally closed water-flow valves 71 and 72 open to allow water to flow to the vaporizing unit 12. The water vaporizes and rises into the air chute 27. If the temperature in the vaporizing unit rises to about 400° F. the normally open thermostatic switch 64 closes so that the lock-out relay 92 is activated. The switch 97 is closed to activate the light 107 and the switch 96 is opened so as to no longer connect leads 84 and 95. As a result the relay 94 is deactivated and the switches 104, 105 and 106 are opened so that the heating elements 53 are turned off or no longer heating. Also, with the opening of the switch 96 the valves 71 and 72 close so as to stop the flow of water to the vaporizing unit 12.

Also provided in the lead 95 is a thermostatic switch 108. This switch is located in the exit side of the air duct 27. It is normally closed but if the air temperature in the duct 27 rises above about 209° F. the switch opens to deactivate the relay 94 and to close the valves 71 and 72.

Another feature of this humidifier is that the low-limit thermostatic switch 63 controls the level of the water entering the vaporizing unit 12. More particularly, with this switch set to close at about 198° F., viz., the temperature at which water boils at approximately 8,000 feet elevation, the flow of water, i.e., the level of water, to the vaporizing unit is controlled since the water on reaching the level of switch 63 will cool it and cause it to open, thereby closing valves 71 and 72.

While one embodiment of my invention has been shown and described it will be apparent that other adaptations and modifications may be made without departing from the scope of the following claim.

I claim:

A humidifier for an airplane comprising a compartment having a top, bottom, front, back and opposed sides, perforate baffles in said compartment, said front having an inlet opening in the upper part thereof and one said side having an outlet opening in the upper part thereof, wall means forming a curved air duct in said compartment and extending between said openings, a heater unit beneath and adjacent said bottom and underlying said duct, said heater unit comprising means defining a chamber, heater elements and water inlet means within said chamber, a chimney extending from said chamber means through said compartment to said air duct and communicating with said chamber means through the upper part thereof and with the air duct through an opening in the bottom thereof, valved pipe means communicating said compartment with said water inlet means, and pipe means for introducing air under a pressure head from said air duct to said compartment.

References Cited in the file of this patent

UNITED STATES PATENTS

| | | |
|---|---|---|
| 1,425,608 | Sallada | Aug. 15, 1922 |
| 2,075,314 | Suppes | Mar. 30, 1937 |
| 2,503,002 | Shreve | Apr. 4, 1950 |
| 2,584,650 | Woodruff | Feb. 5, 1952 |
| 2,621,650 | Pittendreigh | Dec. 16, 1952 |
| 2,805,660 | Coleman et al. | Sept. 10, 1957 |
| 2,860,228 | Boyle et al. | Nov. 11, 1958 |